United States Patent [19]

Michel

[11] Patent Number: 4,700,450

[45] Date of Patent: Oct. 20, 1987

[54] PREPARATION AND RENOVATION OF A FUSION ROLLER FOR A XEROGRAPHIC MACHINE, FUSION ROLLER AND VULCANIZABLE COMPOSITION

[75] Inventor: Lucien P. Michel, Neuilly Sur Seine, France

[73] Assignee: Ateliers de Conceptions et d'Innovations Industrielles, Courbevoie, France

[21] Appl. No.: 828,282

[22] Filed: Feb. 11, 1986

[30] Foreign Application Priority Data

Feb. 12, 1985 [FR] France ............................. 85 01956

[51] Int. Cl.$^4$ ..................... B23P 17/00; C08K 3/22
[52] U.S. Cl. ..................... 29/527.2; 524/433; 524/544; 29/132; 29/148.4 D; 118/60; 355/3 FU
[58] Field of Search ............ 29/132; 355/3 FU; 118/60; 219/216; 430/99; 524/544, 545, 546, 433, 487, 489, 456

[56] References Cited

U.S. PATENT DOCUMENTS

| | | | |
|---|---|---|---|
| 3,877,125 | 4/1975 | Finzer | 29/148.4 D |
| 3,929,095 | 12/1975 | Thetto | 118/60 |
| 3,934,547 | 1/1976 | Jelfo et al. | 118/60 |
| 3,999,038 | 12/1976 | Sikes, Jr. et al. | |
| 4,083,092 | 4/1978 | Imperial et al. | 29/132 |
| 4,149,797 | 4/1979 | Imperial | 355/3 FU |
| 4,375,505 | 3/1983 | Newkirk | 29/132 X |
| 4,446,270 | 5/1984 | Guenthner et al. | 524/433 |
| 4,503,171 | 3/1985 | Stewart | 524/544 X |

FOREIGN PATENT DOCUMENTS

| | | |
|---|---|---|
| 2442173 | 3/1976 | Fed. Rep. of Germany . |
| 2824994 | 1/1979 | Fed. Rep. of Germany . |
| 59-46666 | 3/1984 | Japan ................................. 353/3 FU |
| 59-46667 | 3/1984 | Japan ................................. 353/3 FU |
| 1143562 | 2/1969 | United Kingdom . |

Primary Examiner—Howard N. Goldberg
Assistant Examiner—Carl J. Arbes
Attorney, Agent, or Firm—Blakely, Sokoloff, Taylor & Zafman

[57] ABSTRACT

The invention relates to a method of preparation of an outer cover of a fusion roller for a xerographic machine, this cover being constituted by a homogeneous layer covering a hollow metal core receiving heating means.

According to the invention, this method comprises the steps of (a) cold kneading a mixture having, for 100 parts of fluorine-containing rubber, 55 to 60 parts of carbon black, 2 to 6 parts of magnesium oxide, 4 to 8 parts of calcium hydroxyde and 0 to 2 parts of polyethylene wax; (b) forming the covering material by extrusion or calendering of this mixture; (c) application of this material in a homogeneous layer to the surface of the metallic core of the roller; (d) vulvanization at elevated temperature and under pressure of the material thus applied to the core; (e) dressing of the cover to a constant thickness.

11 Claims, No Drawings

PREPARATION AND RENOVATION OF A FUSION ROLLER FOR A XEROGRAPHIC MACHINE, FUSION ROLLER AND VULCANIZABLE COMPOSITION

The present invention relates to a method of preparation of an outer cover of a fusion roller for a xerographic machine, applicable not only to the original manufacture of these rollers but also to the renovation of used rollers; it also relates to fusion rollers obtained by this method, as well as a vulcanisable composition for this cover.

Xerographic machines traditionally incorporate a toner (or developer powder) fusion station, which receives the sheets of paper on which the toner powder is deposited at the exposed points and submits this sheet to a double action of heating and compression for ensuring the fusion of the toner and its penetration into the fibres of the paper to fix definitively the image obtained.

This fusion station incorporates a fusion roller and a pressure roller in close contact. The fusion roller is a heating roller constituted by a hollow core, generally metallic, receiving heating means (for example a quartz lamp) and covered by a thin, anti-adhesive layer; for its part the pressure roller is constituted by a core covered with a flexible cover, which is relatively thick (with respect to the cover of the fusion roller). There is in fact provided a system for applying onto the fusion roller a very thin layer of lubricating agent or freeing agent, for example a silicone oil, for enhancing the anti-adhesive characteristics of the fusion roller and thus avoiding any transfer of toner from the paper onto the fusion roller, which would produce smudging of the following sheets of paper.

Such a toner fusions is particularly described in U.S. Pat. No. 4,083,092 (more particularly concerning the material of the cover of the pressure roller), French Patent Specification No. FR-2 437 646 (more particularly concerning the system for distributing the lubricating agent), and Fr-2 437 647 U.S. Pat. No. 4,197,445 (more particularly concerning the means for heating the fusion roller), all three in the name of the XEROX CORPORATION.

As concerns the cover of the fusion roller, there is the need to choose a material having at the same time a good resistance to temperature (the surface temperature of the fusion roller can exceed 200° C. continuously), a surface condition permitting retention of the anti-adhesive properties required whilst limiting the lubrication to a minimum, and a retention of these properties despite intense usage (usually of the order of several hundreds of thousands of copies). In addition, the thickness of this cover ought to be relatively low so as not to create an obstacle to the transmission of heat from the inside of the roller to its surface.

It has been proposed for this to utilise as a cover fluorine-containing polymers such as those known under the names TEFLON ® (which is a polymer or a copolymer of TFE: tetrafluoroethylene), VITON ® A (which is a VDF/HFP elastomer; a copolymer of vinylidene fluoride and of hexafluoropropene) or VITON ® B (which is an FKM elastomer of the VDF/HFP/TFE type: a copolymer of vinylidene fluoride, of hexafluoropropene and of tetrafluoroethylene). The recent usage of these two last materials (mentioned in the above specifications) has permitted an improvement in the quality of copies and a lengthening of the duration of life of the rollers, which now achieve values of the order of 1 million copies.

The low chemical reactivity of these materials nevertheless creates a certain number of difficulties during the application of the cover onto the metallic core for ensuring suitable adherence of the cover to its support, without risk of detachment after prolonged usage; this is why there is generally provided a cover of heterogeneous structure having a first layer of adherent elastomer, and a second layer of fluorine-containing polymer of the type mentioned above (TEFLON ® or VITON ®).

For a core of copper (a material often used because of its excellent thermal conductivity), there is a need to provide in addition an aluminium layer deposited on the copper and sand-blasted to increase its roughness.

The resistance to temperature of covers used up to now is nevertheless limited to values of the order of 220° C. This limits the functioning speed of the device and requires very precise and reliable temperature regulation systems, unless there is provided, in addition to the inside source of heat, a supplementary outside source, as envisaged in the mentioned U.S. Pat. No. 4,197,445.

One of the objects of the invention is to propose a new type of cover, and its method of fabrication, permitting continuous achievment of values of temperature much greater than the mentioned values, for example able to support without degradation continuous temperatures of the order of 260° C.

The increase of continuous working temperature permits in addition perfect baking of the toner equally well on heavy papers, adhesive labels, or any thick support.

In fact, the resistance to elevated temperature permits the fusion roller to sustain without damage any jamming which can happen at the fusion station; in the heaviest cases, indeed one notices, at the moment of jamming, a momentary arrest of the roller producing a significant local elevation of temperature and as a result a degradation of the cover material of the fusion roller, particularly of its surface state; after return to operation, one notes that th toner adheres to the roller at this point, producing permanent smudging of copies made thereafter.

Another object of the invention is to propose a cover attainng a notable prolongment of the working life before replacement of the roller, whilst preserving an excellent final quality of copies obtained.

Another object of the invention is to propose a cover limiting to a minimum the utilisation of lubricating agent. Further the economy of consumable product which results, the diminution of the quantity of silicone oil used, permits in particular writing or striking on to the copy made, immediately on exit from the machine.

Another object of the invention is in fact to propose a method of renovation of the used fusion rollers, which provides for the renovated roller the same characteristics as a new roller, notably the dimensional characteristics concerning the thickness of the cover. One of the difficulties of fusion roller renovation operations is in effect the need to preserve constant the thickness of the cover, independent of the diameter of the roller, and to obtain a product having no ovalisation nor irregularity of form or of state of the surface.

This homogeneous quality must in particular be obtained for rollers comprising a central cylindrical region and two divergent truncoconical end regions (intended to permit a better spreading onto the copy of the lubricating agent): despite this particular form, the thickness and quality of the cover must be identical at all points of the roller.

Finally, one will see that the cover made according to the directions of the invention is a homogeneous roller, formed as a single layer applied directly on to the metallic core (in contrast to the present rollers, which usually have a composite cover in two layers, as indicated above). This structure simplifies the operations of manufacture and of renovation, and permits very thin thickness of the cover, which provides only a minimum obstacle to the transmission of heat.

For this, the method of preparation according to the invention comprises the following steps:
(a) cold kneading a mixture having, for 100 parts of a rubber of a fluorine-containing elastomer, 55 to 60 parts of carbon black, 2 to 6 parts of magnesium oxide, 4 to 8 parts of calcium hydroxide and 0 to 2 parts of polyethylene wax,
(b) forming the cover material by extrusion or calendering of this mixture,
(c) application of this material in a homogeneous layer to the surface of the core of the roller,
(d) vulcanisation at elevated temperature and under pressure of the material thus applied onto the core,
(e) dressing of the cover to a constant thickness.

Advantageously, there is provided, during the dressing stage, a final finishing cut of the surface permitting closing by polishing of the cells of the material.

Thus the finishing of the cover is effected to an appropriate state of the surface, for example a surface state for obtaining a satin grain of the copy, with maximum baking and minimum lubrication.

Preferably, after the vulcanisation stage, there is provided a stoving stage for permitting degassing and the stabilisation of the vulcanised material.

Preferably also, the cover is dressed to a thickness less than 0.25 mm.

This low value assures an excellent transmission of heat from the metallic core to the surface of the cover. In addition, from the fact of the homogeneous structure of the cover (the absence of an adhering layer between the metal of the core and a thin surface layer), it becomes possible to prolong use of the roller, the cover being able to be used throughout its thickness.

In the case of a roller comprising a central cylindrical region and two divergent truncoconical end regions, the dressing is carried out to a constant thickness over all the surface of the roller, and the relative speed of the dressing tool with respect to the surface to be dressed is held constant at all points in the truncoconical regions.

In addition, it is also possible to provide a final stage of matting of the inside wall of the core, in the case where this wall would be a bright wall. This matting assists the absorption of heat by the material of the roller by reducing the reflections of thermal energy radiated by the source.

The invention also relates to a method of renovation of fusion rollers for a xerographic machine, comprising the stages of: stripping the core of the roller by dressing to a desired shape, and application of an outside cover by the mentioned method of preparation.

The invention also relates to a vulcanisable composition for a cover material of a fusion roller for a xerographic machine, formed of a mixture having, for 100 parts of rubber of fluorine-containing elastomer, 55 to 60 parts of carbon black, 2 to 6 parts of magnesium oxide, 4 to 8 parts of calcium hydroxide and 0 to 2 parts of polyethylene wax.

The characteristics and advantages of the invention will be explained in detail with the aid of the following detailed description below of a preferred embodiment of the method.

A. Stripping of the core

This stage is only necessary in the case where an existing roller is being renovated; it has the object of eliminating entirely the existing covering. For this a dressing of the roller to the desired shape is carried out, that is to say having regard to the conicity in the case of rollers having a central cylindrical region and two divergent truncoconical end regions.

B. Preparation of the surface of the core

For assisting the ultimate bonding of the cover, a mild sand-blasting (or shot blasting or microballing) is carried out on the part of the roller to receive the cover.

It should be noted in this respect that, in the case of cores of copper, it is not necessary to make a preliminary deposit of aluminium, in contrast to the prior art methods.

In addition, the core can be constituted of very diverse materials, such as copper, brass, aluminium, stainless steel or even non-metallic materials such as composites with fibres of carbon or even glass, according to the envisaged applications. The reference to a metallic core in the description is not in any way limitative, and the material of the core does not substantially modify the method of the invention.

C. Preparation of the vulcanisable composition

The following constituents are needed in a roller mixer of conventional type in a manner to obtain a homogeneous rubber:

a rubber of a fluorine-containing elastomer preferably a hydrogen-containing fluoroelastomer, for example of the type VITON ® A or B already mentioned above (sold by DU PONT DE NEMOURS), or FLUOREL ® No. 2181 or 2177 (sold by 3M): VITON A and FLUOREL 2181 are VDF/HFP elastomers (in accordance with the nomenclature mentioned above); VITON B and FLUOREL 2177 are FKM elastomers of the VDF/HFP/TFE type, carbon black (for example according to the standard ASTM No. 990) in a proportion of 55 to 60 parts for 100 parts of rubber, preferably approximately 55 parts (here and in the following, all proportions are given by weight, for 100 parts of rubber), magnesium oxide 2 to 6 parts, preferably approximately 3 parts, calcium hydroxide, for example of the VE type (sold by STURGE): 4 to 8 parts, preferably approximately 6 parts, polyethylene wax, for example of the type EPOLENE R (sold by EASTMAN): 0 to 2 parts, preferably approximately 2 parts.

The kneading is carried out at ambient temperature for a period a function of the quantity of matter to be prepared (for example 20 to 40 minutes for the preparation of 20kg of mixture).

The mixture is then formed by calendering (for obtaining plates of rubber), or extrusion (for obtaining a tube or a slug).

D. Vulcanisation

This operation, which comprises the transfer of the rubber onto the roller, is carried out by moulding at elevated temperature and under pressure.

According to the case, a sheet of previously cut rubber is rolled onto the metallic roller, the roller is positioned inside a portion of rubber extruded in a tube, or again a slug of rubber flowing under the pressure and temperature of the mould is placed in the mould.

Preferably an agent promoting adherence will already have been applied onto the roller, for example a solution of a silane F 5150 (sold by 3M), diluted in the proportion of 10 to 50% in a mixture of methyl alcohol to 85% and isopropyl alcohol (this example relates to a promoter of adherence onto metal; the choice of agent depends largely on the material of the core and the type of elastomer used).

The vulcanisation is carried out at a temperature between 160° C. and 200° C. with a progressive increase in temperature and a stage of approximately ½ hour at the maximum temperature.

The mould is a metallic mould heated by steam, the pressure at the surface of the mould being of the order of 20 to 30 bars on closing.

E. Post-vulcanisation

This operation has the object of ensuring the complete degassing and the definitive stabilisation of the cover of the roller.

It is carried out in a ventilated stove at a maximum temperature of 230° C. to 260° C., with an increase by stages of 150° C. to 200° C., with a duration of 2 to 4 hours at the stages. The duration of the stage at maximum temperature is of the order of 16 to 24 hours.

F. Final dressing of the cover

After this stoving stage, the cover of the rollers has a rough thickness of the order of 1.5 to 2 mm. It is necessary to reduce this thickness to values less than 0.25 mm, for example 0.18 mm, with a tolerance of ±0.01 mm and this, despite an overall diameter of the roller which can vary by ±2 mm: in particular, when a renovation of a used roller is being carried out, it is not possible to guarantee with precision the edges and exact centering of the roller; the thickness of the new cover must on the other hand be constant and precise, independent of the diameter of the renovated roller and avoiding all out-of-round.

In addition, it is necessary to have regard to the conicity of the ends of the roller, the cover having to have at this point the same thickness and the same surface state as on the central, cylindrical part.

For this, the machining is carried out, in several cuts, by a numerically controlled grinding machine programmed as a function of the desired shape of the roller, as concerns the displacement of the tool (the depth of successive cuts, the speed of advance, and regard to the conicity) as well as the speed of dressing (which must remain constant whatever the variation of diameter due to the conicity; the speed of rotation of the machine must then be progressively decreased in proportion as the diameter increases).

In particular, the finishing cut—which conditions the final surface state of the fusion roller—necessitates a certain number of precautions:

choice of the dressing wheel: for example of the type EKM 120 JOT 5-V-50 or EKR 60/80/5 D/E 14-V-50 which are finishing dressing wheels with an open structure sold by LAPPORT, previous dressing of this, for obtaining the desired precision and avoiding any clogging.

This finishing cut permits the closing of the cells of the cover; the parameters of machining can vary as a function of the desired state of the surface, and function of the envisaged applications (grain of the copy, aspect satin or brilliant, . . .).

Final control of the thickness of the cover is effected by means of an ultrasonic detector, for example of the type Panametrics S 222 (transducer M112) coupled to a Hameg HM 705 oscilloscope.

The examination of echos permits certifying the final result in detecting any defect in thickness of the cover, as well as any ovalisation or out-of-round of the roller, which could have been produced in the vulcanisation.

The rollers made according to this method possess a superficial hardness of the order of 88-92 Shore A and an excellent surface state (mirror polished), permitting the obtaining of copies of a quality at least equal to that obtained with traditional rollers, whilst reducing the lubrication in substantial proportions. The properties are still preserved at a continuous operating temperature of 260° C. (instead of 210° C. maximum for the traditional rollers), and the duration of life achieves 2 million copies (instead of 1 million copies).

G. Treatment of the inside surface of the roller

It can be useful to matt this surface in the case where it would be bright, to reduce the reflection of heat towards the radiant source.

This matting can for example be obtained by filling the roller with balls (stainless steel, glass, . . .) or polishing stones, then rotary shaking.

I claim:

1. A method of preparation of an external cover of a fusion roller for a xerographic machine, said cover being constituted by a homogeneous layer covering a hollow core receiving heating means, said method comprising the stages of:
   (a) cold kneading a mixture having, for 100 parts of a rubber of a fluorine-containing elastomer, 55 to 60 parts of carbon black, 2 to 6 parts of magnesium oxide, 4 to 8 parts of calcium hydroxide and 0 to 2 parts of polyethylene wax,
   (b) forming said mixture by extrusion or calendering into a cover material,
   (c) application of said cover material in a homogeneous layer to the surface of said core of said roller,
   (d) vulcanisation at elevated temperature and under pressure of said cover material thus applied onto said core,
   (e) dressing of said cover to a constant thickness.

2. A method according to claim 1, in which there is provided, during said dressing stage, a final cut of the surface of said cover permitting the closing by polishing of the cells of said cover material.

3. A method according to claim 1, comprising, after the vulcanisation stage, a stoving stage for permitting the degassing and stabilisation of said vulcanised cover material.

4. A method according to claim 1, in which said cover is dressed to a thickness less than 0.25 mm.

5. A method according to claim 1, in which said roller comprises a central cylindrical region and two divergent truncoconical end regions, said dressing stage being carried out to a constant thickness throughout the surface of said roller and the relative speed of the dressing tool with respect to the surface to be dressed being maintained constant at all points in said truncoconical regions.

6. A method according to claim 1, having in addition a final stage of matting the inside wall of the core.

7. A method of renovation of fusion rollers or a xerographic machine comprising the stages of:
 (a) stripping a core of a roller by grinding to a desired shape;
 (b) cold kneading a mixture having, for 100 parts of a rubber of a flourine-containing elastomer, 55 to 60 parts of carbon black, 2 to 6 parts of magnesium oxide, 4 to 8 parts of calcium hydroxide and 0 to 2 parts of polyethylene wax;
 (c) forming said mixture by extrusion or calendering into a cover material;
 (d) applying said cover material in a homogeneous layer to the surface of said core of said roller,
 (e) vulcanizing said cover material thus applied onto said core at an elevated temperature and under pressure,
 (f) dressing said cover to a constant thickness.

8. A fusion roller for a xerographic machine, obtained by said method of claim 1.

9. A fusion roller for a xerographic machine, obtained by said method of claim 7.

10. A vulcanisable composition for a covering material for a fusion roller for a xerographic machine, said vulcanisable composition formed of a mixture having, for 100 parts of rubber of a fluorine-and-hydrogen-containing elastomer, 55 to 60 parts of carbon black, 2 to 6 parts of magnesium oxide, 4 to 8 parts of calcium hydroxide and 0 to 2 parts of polyethylene wax.

11. A vulcanizable composition for a covering material for a fusion roller for a xerographic machine, said vulcanizable composition formed of a mixture having, for 100 parts of rubber of a fluorine-containing elastomer, 55 to 60 parts of carbon black, 2 to 6 parts of magnesium oxide, 4 to 8 parts of calcium hydroxide and $\frac{1}{2}$ to 2 parts of polyethylene wax.

* * * * *

UNITED STATES PATENT AND TRADEMARK OFFICE
CERTIFICATE OF CORRECTION

PATENT NO. : 4,700,450
DATED : 10-20-87
INVENTOR(S) : Michel

It is certified that error appears in the above-identified patent and that said Letters Patent is hereby corrected as shown below:

| COLUMN | LINE | DESCRIPTION |
|---|---|---|
| 01 | 36 | delete "fusions" insert --fusion station -- |
| [75] | 05 | delete "Lucien P. Michel" insert --Lucien Pozzo Michel-- |

Signed and Sealed this

Twenty-fifth Day of October, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,700,450

DATED : Oct. 20, 1987

INVENTOR(S) : Michel Lucien Pozzo

It is certified that error appears in the above-identified patent and that said Letters Patent is hereby corrected as shown below:

On the title page

[75] Inventor: Delete "Lucien P. Michel" insert --Michel Lucien Pozzo--

Item [19] "Michel" should read -- Pozzo --.

Signed and Sealed this

Eighteenth Day of July, 1989

Attest:

DONALD J. QUIGG

*Attesting Officer*  *Commissioner of Patents and Trademarks*